United States Patent
In et al.

(10) Patent No.: US 9,921,351 B2
(45) Date of Patent: Mar. 20, 2018

(54) MULTILAYERED OPTICAL FILM, MANUFACTURING METHOD THEREOF, AND DISPLAY DEVICE

(71) Applicants: SAMSUNG ELECTRONICS CO., LTD., Suwon-si, Gyeonggi-do (KR); CHEIL INDUSTRIES INC., Gumi-si, Gyeongsangbuk-do (KR)

(72) Inventors: Kyu Yeol In, Seoul (KR); Hee Kyung Kim, Seongnam-si (KR); Won Cheol Jung, Seoul (KR); Hyung Jun Kim, Suwon-si (KR); Kyoung Ah Oh, Seoul (KR); Moon Yeon Lee, Osan-si (KR); Myung Sup Jung, Seongnam-si (KR)

(73) Assignees: SAMSUNG ELECTRONICS CO., LTD., Gyeonggi-Do (KR); CHEIL INDUSTRIES, INC., Gyeongsangbuk-Do (KR)

( * ) Notice: Subject to any disclaimer, the term of this patent is extended or adjusted under 35 U.S.C. 154(b) by 174 days.

(21) Appl. No.: 13/891,401

(22) Filed: May 10, 2013

(65) Prior Publication Data
US 2013/0301129 A1    Nov. 14, 2013

(30) Foreign Application Priority Data

May 10, 2012  (KR) .................. 10-2012-0049647
May 10, 2013  (KR) .................. 10-2013-0052872

(51) Int. Cl.
*G02B 5/30*    (2006.01)
*B29C 55/04*   (2006.01)
(Continued)

(52) U.S. Cl.
CPC .......... *G02B 5/3083* (2013.01); *B29C 55/045* (2013.01); *B29D 11/0073* (2013.01);
(Continued)

(58) Field of Classification Search
CPC ........ H04N 5/66; G02F 1/13363; G02B 1/04; G02B 1/08; G02B 5/30; G02B 5/3008;
(Continued)

(56) References Cited

U.S. PATENT DOCUMENTS 5,657,140 A * 8/1997 Xu et al. .................. 349/118
5,736,066 A * 4/1998 Noguchi et al. ......... 252/299.01
(Continued)

FOREIGN PATENT DOCUMENTS

CN    1559013    12/2004
CN    1825188    8/2006
(Continued)

OTHER PUBLICATIONS

Extended European Search Report for Application No. 13167344.4-1562 dated Jul. 30, 2013.
(Continued)

*Primary Examiner* — Stephone B Allen
*Assistant Examiner* — Adam W Booher
(74) *Attorney, Agent, or Firm* — Cantor Colburn LLP

(57) ABSTRACT

An optical film includes: a polarization layer; a first phase retardation layer having an optic axis at an angle in a range from about 17 degrees to about 27 degrees or from about −27 degrees to about −17 degrees with respect to a transmission axis of the polarization layer; and a second phase retardation layer having an optic axis at an angle in a range from about 85 degrees to about 95 degrees with respect to the transmission axis of the polarization layer. The polarization layer, the first phase retardation layer, and the second phase retardation layer are deposited in sequence, the first phase retardation layer is a half-wave plate, the second phase retardation layer is a quarter-wave plate, and out-of-plane retardation values of the first phase retardation layer and the
(Continued)

second phase retardation layer for incident light having the standard wavelength have opposite signs.

11 Claims, 7 Drawing Sheets

(51) Int. Cl.
*B29D 11/00* (2006.01)
*B32B 37/12* (2006.01)
*B29K 23/00* (2006.01)
*B29K 29/00* (2006.01)
*B32B 38/00* (2006.01)

(52) U.S. Cl.
CPC ........ *B29D 11/00788* (2013.01); *B32B 37/12* (2013.01); *G02B 5/3025* (2013.01); *B29K 2023/38* (2013.01); *B29K 2029/04* (2013.01); *B29K 2995/0034* (2013.01); *B32B 38/0008* (2013.01); *B32B 2037/1276* (2013.01); *B32B 2038/0028* (2013.01); *B32B 2307/40* (2013.01)

(58) Field of Classification Search
CPC ..... G02B 5/3025–5/305; G02B 5/3083; G02B 5/32; G02B 27/28–27/288; B32B 27/308; B32B 27/325; B32B 2038/0028
USPC ............ 359/483.01, 487.01–487.06, 489.01, 359/489.07, 492.01; 264/1.34, 1.6, 1.7
See application file for complete search history.

(56) References Cited

U.S. PATENT DOCUMENTS

| | | | |
|---|---|---|---|
| 6,324,482 B1 | 11/2001 | Nakagaki et al. | |
| 6,507,202 B1 | 1/2003 | Sasanouchi et al. | |
| 6,577,364 B1* | 6/2003 | Tillin .................. | G02F 1/13363 349/113 |
| 7,169,447 B2* | 1/2007 | Su Yu .................. | G02B 5/3016 349/117 |
| 7,319,500 B2 | 1/2008 | Yoshida et al. | |
| 7,468,777 B2 | 12/2008 | Kawamoto et al. | |
| 7,473,446 B2 | 1/2009 | Ito et al. | |
| 7,548,290 B1 | 6/2009 | Kitamura et al. | |
| 7,582,339 B2 | 9/2009 | Kim et al. | |
| 7,649,599 B2 | 1/2010 | Kim et al. | |
| 7,852,561 B2 | 12/2010 | Chiba et al. | |
| 7,906,184 B2 | 3/2011 | Umemoto et al. | |
| 7,999,893 B2 | 8/2011 | Sakai et al. | |
| 8,440,117 B2 | 5/2013 | Kim et al. | |
| 8,801,978 B2 | 8/2014 | Kim et al. | |
| 2004/0212767 A1 | 10/2004 | Sasaki et al. | |
| 2005/0057714 A1 | 3/2005 | Jeon et al. | |
| 2006/0001799 A1 | 1/2006 | Kawamoto et al. | |
| 2006/0203159 A1 | 9/2006 | Kawamoto et al. | |
| 2007/0008459 A1 | 1/2007 | Park et al. | |
| 2007/0139773 A1 | 6/2007 | Kawamoto et al. | |
| 2007/0231506 A1* | 10/2007 | Ohgaru et al. ................ | 428/1.31 |
| 2007/0279556 A1* | 12/2007 | Wang et al. .................. | 349/102 |
| 2008/0043332 A1 | 2/2008 | Chiba et al. | |
| 2009/0067574 A1 | 3/2009 | Johnson | |
| 2009/0068472 A1 | 3/2009 | Umemoto et al. | |
| 2009/0096962 A1* | 4/2009 | Shelton et al. ................. | 349/96 |
| 2009/0096970 A1 | 4/2009 | Sakai et al. | |
| 2009/0103016 A1 | 4/2009 | Shutou et al. | |
| 2009/0135343 A1* | 5/2009 | Kitamura et al. .............. | 349/96 |
| 2011/0025966 A1 | 2/2011 | Sakai | |

FOREIGN PATENT DOCUMENTS

| | | |
|---|---|---|
| CN | 101089698 | 12/2007 |
| EP | 0916989 A2 | 5/1999 |
| EP | 2042896 A2 | 4/2009 |
| JP | 02120804 A | 5/1990 |
| JP | 05045520 A | 2/1993 |
| JP | 3174367 B2 | 3/2001 |
| JP | 2003270435 | 9/2003 |
| JP | 2005-284024 A | 10/2005 |
| JP | 2006-178389 A | 7/2006 |
| JP | 2006527394 A | 11/2006 |
| JP | 2007004120 | 1/2007 |
| JP | 2007025668 | 2/2007 |
| JP | 2007-156121 A | 6/2007 |
| JP | 2007171943 | 7/2007 |
| JP | 2007286141 | 11/2007 |
| JP | 2008-268913 | 11/2008 |
| JP | 2009110005 | 11/2008 |
| JP | 2009237421 | 10/2009 |
| JP | 2010-286837 | 12/2010 |
| JP | 2013-100586 | 5/2013 |
| KR | 1020020058272 A | 2/2002 |
| KR | 10-2007-0097596 | 10/2007 |
| KR | 1020070104622 A | 10/2007 |
| KR | 100805504 | 2/2008 |
| KR | 100807606 | 2/2008 |
| KR | 1020080035592 | 4/2008 |
| KR | 1020080047400 A | 5/2008 |
| KR | 1020090028574 | 3/2009 |
| KR | 1020100078259 A | 7/2010 |
| KR | 1020100130975 | 12/2010 |

OTHER PUBLICATIONS

Lee, et al, "Designs of broadband and wide-view patterned polarizers for steroscopic 3D displays" Optics Express, Dec. 2010, pp. 27079-27094, vol. 18 No. 26.
Chinese Office Action—Chinese Patent Application No. 201310172717 dated Aug. 26, 2015, citing CN1825188A.
Korean Office Action—Korean Application No. 10-2013-0052872 dated Dec. 8, 2015.
Korean Office Action—Korean Application No. 10-2013-0052872 dated Aug. 24, 2016.
Japanese Office Action—Japanese Patent Application No. 2013-100586 dated Nov. 28, 2016.

* cited by examiner

MULTILAYERED OPTICAL FILM, MANUFACTURING METHOD THEREOF, AND DISPLAY DEVICE

CROSS-REFERENCE TO RELATED APPLICATIONS

This application claims priority to Korean Patent Application No. 10-2012-0049647 filed on May 10, 2012 and Korean Patent Application No. 10-2013-0052872 filed on May 10, 2013, and all the benefits accruing therefrom under 35 U.S.C. § 119, the content of which in its entirety is herein incorporated by reference.

BACKGROUND

(a) Field

Provided is an optical film, and in particular, a multilayered optical film, a manufacturing method of the optical film, and a display device including the optical film.

(b) Description of the Related Art

Flat panel displays may be classified into an emitting display device that emits light by itself and a non-emitting display device that uses separate light sources. An optical compensation film such as a phase difference film may be used for improving image quality of the flat panel displays.

In the emitting display device, for example, an organic light emitting display, visibility and contrast ratio may be decreased due to reflection of external light by metal such as an electrode in the display device. In the emitting display device, a polarizing plate and a phase difference film may be used to effectively prevent the external light reflected in the display device from leaking out of the display device.

In a liquid crystal display ("LCD"), which is a type of non-emitting display device, reflection of external light and sunglass effect may be reduced by converting linear polarization into circular polarization based on the types of the LCD including a transmissive type, a transflective type, and a reflective type, thereby improving the image quality of the LCD.

However, conventional optical compensation films may have strong dependency on the wavelength of incident light such that the film may effectively operate on the light having a particular wavelength but may not effectively operate on the light having other wavelengths.

SUMMARY

An embodiment of an optical film includes: a polarization layer; a first phase retardation layer having an optic axis at an angle in a range from about 17 degrees to about 27 degrees or from about −27 degrees to about −17 degrees with respect to a transmission axis of the polarization layer; and a second phase retardation layer having an optic axis at an angle in a range from about 85 degrees to about 95 degrees with respect to the transmission axis of the polarization layer, where the polarization layer is disposed on the first phase retardation layer, the first phase retardation layer is disposed on the second phase retardation layer, an in-plane retardation value of the first phase retardation layer at a standard wavelength of about 550 nanometers (nm) is in a range from about 240 nm to about 300 nm, an in-plane retardation value of the second phase retardation layer at the standard wavelength is in a range from about 110 nm to about 160 nm, and an out-of-plane retardation value of the first phase retardation layer at the standard wavelength and an out-of-plane retardation value of the second phase retardation layer at the standard wavelength have opposite signs.

In an embodiment, the out-of-plane retardation value of the first phase retardation layer at the standard wavelength may be in a range from about zero (0) nm to about 300 nm, and the out-of-plane retardation value of the second phase retardation layer at the standard wavelength may in a range from about −160 nm to about zero (0) nm.

In an embodiment, the out-of-plane retardation value of the first phase retardation layer at the standard wavelength may in a range from about 130 nm to about 250 nm, and the out-of-plane retardation value of the second phase retardation layer at the standard wavelength may in a range from about −130 nm to about −50 nm.

In an embodiment, the first phase retardation layer may have a short-wavelength dispersion value in a range from about 1.00 to about 1.05, the second phase retardation layer may have a short-wavelength dispersion value in a range from about 1.00 to about 1.20, the first phase retardation layer may have a long-wavelength dispersion value in a range from about 0.95 to about 1.00, and the second phase retardation layer may have a long-wavelength dispersion value in a range from about 0.85 to about 1.00.

In an embodiment, at least one of the first phase retardation layer and the second phase retardation layer may include at least one of a cyclo-olefin polymer, polyacrylate, polycarbonate, polystyrene, polyethylene terephthalate and a cellulose-based polymer.

In an embodiment, the first phase retardation layer may include a cyclo-olefin polymer, and the second phase retardation layer may include polyacrylate.

In an embodiment, the optical film may further include a passivation layer disposed opposite to the second phase retardation layer with respect to to the first phase retardation layer.

In an embodiment, the polarization layer may include a first roll film extending in a first direction substantially perpendicular to the transmission axis, the first phase retardation layer may include a second roll film extending in the first direction, having an optic axis at an angle in a range from about 17 degrees to about 27 degrees or from about −27 degrees to about −17 degrees with respect to a second direction substantially perpendicular to the first direction, and disposed on the first roll film, and the second phase retardation layer may include a third roll film extending in the first direction, having an optic axis at an angle in a range from about 85 degrees to about 95 degrees with respect to the second direction, and disposed on the second roll film.

In an embodiment, the in-plane retardation value of the first phase retardation layer at the standard wavelength may be in a range from about 260 nanometers to about 280 nanometers, and the in-plane retardation value of the second phase retardation layer at the standard wavelength may be in a range from about 130 nanometers to about 140 nanometers.

In an embodiment, the out-of-plane retardation value of the first phase retardation layer at the standard wavelength may be in a range from about 200 nanometers to about 230 nanometers, and the out-of-plane retardation value of the second phase retardation layer at the standard wavelength may be in a range from about −120 nanometers to about −90 nanometers.

In an embodiment, the polarization layer, the first phase retardation layer, and the second phase retardation layer may be sequentially stacked.

An embodiment of a method of manufacturing an optical film includes: unrolling a roll of a polarization layer, a roll of a first phase retardation layer and a roll of a second phase retardation layer; proceeding an unrolled portion of the polarization layer, an unrolled portion of the first phase retardation layer and an unrolled portion of the second phase retardation layer in a proceeding direction; and disposing a proceeded portion of the polarization layer, a proceeded portion of the first phase retardation layer and a proceeded portion of the second phase retardation layer to be substantially close to each other, where the polarization layer is stretched in the proceeding direction, the first phase retardation layer is stretched in a direction at an angle in a range from about 63 degrees to about 73 degrees or about −73 degrees to about −63 degrees with respect to the proceeding direction, the second phase retardation layer is stretched in a direction at an angle in a range from about −5 degrees to about 5 degrees with respect to the proceeding direction, and an out-of-plane retardation value of a stretched portion of the first phase retardation layer at a standard wavelength of about 550 nm and an out-of-plane retardation value of a stretched portion of the second phase retardation layer at the standard wavelength have opposite signs.

In an embodiment, the out-of-plane retardation value of the stretched portion of the first phase retardation layer at the standard wavelength may range from about zero (0) nm to about 300 nm, and the out-of-plane retardation value of the stretched portion of the second phase retardation layer at the standard wavelength may range from about −160 nm to zero (0) nm.

In an embodiment, the out-of-plane retardation value of the stretched portion of the first phase retardation layer at the standard wavelength may range from about 130 nm to about 250 nm, and the out-of-plane retardation value of the stretched portion of the second phase retardation layer at the standard wavelength may range from about −130 nm to −50 nm.

In an embodiment, at least one of the first phase retardation layer and the second phase retardation layer may include at least one of a cyclo-olefin polymer, polyacrylate, polycarbonate, polystyrene, polyethylene terephthalate and a cellulose-based polymer.

An embodiment of a display device includes: a display panel; and an optical film disposed on the display panel and including a first phase retardation layer and a second phase retardation layer, where the second phase retardation layer is disposed between the display panel and the first phase retardation layer, an in-plane retardation value of the first phase retardation layer at a standard wavelength of about 550 nm is in a range from about 240 nm to about 300 nm, an in-plane retardation value of the second phase retardation layer at the standard wavelength is in a range from about 110 nm to about 160 nm, an angle between an optic axis of the first phase retardation layer and an optic axis of the second phase retardation layer is in a range from about 63 degrees to about 73 degrees, and an out-of-plane retardation value of the first phase retardation layer at the standard wavelength and an out-of-plane retardation value of the second phase retardation layer at the standard wavelength have opposite signs.

In an embodiment, the display device may further include a polarization layer disposed opposite to the second phase retardation layer with respect to the first phase retardation layer, and the polarization layer may have a transmission axis at an angle in a range from about 85 degrees to about 95 degrees with respect to the optic axis of the second phase retardation layer.

In an embodiment, the out-of-plane retardation value of the first phase retardation layer at the standard wavelength may be in a range from about zero (0) nm to about 300 nm, and the out-of-plane retardation value of the second phase retardation layer at the standard wavelength may be in a range from about −160 nm to about zero (0) nm.

In an embodiment, the out-of-plane retardation value of the first phase retardation layer at the standard wavelength may be in a range from about 130 nm to about 250 nm, and the out-of-plane retardation value of the second phase retardation layer at the standard wavelength may be in a range from about −130 nm to about −50 nm.

In an embodiment, at least one of the first phase retardation layer and the second phase retardation layer may include at least one of a cyclo-olefin polymer, polyacrylate, polycarbonate, polystyrene, polyethylene terephthalate and a cellulose-based polymer.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
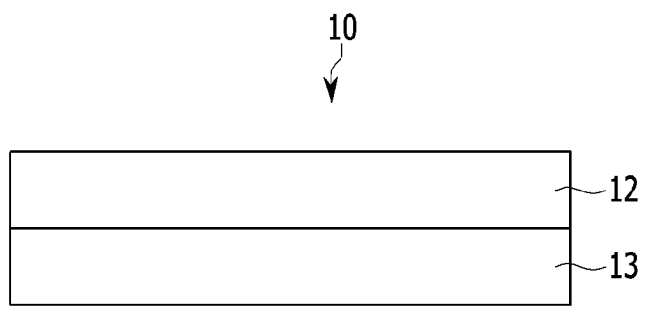
FIG. 1 is a schematic sectional view of an embodiment of an optical film for a display device according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as to essential to the practice of the invention as used herein.

Hereinafter, embodiments of the invention will be described in further detail with reference to the accompanying drawings.

An embodiment of an optical film for a display device is described in detail with reference to FIG. 1.

FIG. 1 is a schematic sectional view of an embodiment of an optical film for a display device according to the invention.

Referring to FIG. 1, in an embodiment, an optical film 10 for a display device includes a first phase retardation layer 12 and a second phase retardation layer 13. In one embodiment, for example, the first phase retardation layer 12 and the second phase retardation layer 13 may be stacked from top to bottom.

An angle between an optic axis of the first phase retardation layer 12 and an optic axis of the second phase retardation layer 13 may be in a range from about 63 degrees to about 73 degrees or from about −73 degrees to about −63 degrees.

According to an embodiment, the first phase retardation layer 12 may have an in-plane retardation (Re) value in a range from about 240 nanometers (nm) to about 300 nanometers (nm) at a wavelength of about 550 nm, which will hereinafter be referred to as a "standard wavelength." In one embodiment, for example, the first phase retardation layer 12 may have an in-plane retardation (Re) value in a range from about 260 nm to about 280 nm at the standard wavelength. The in-plane retardation Re of a layer is generally given by the to following equation: $Re=(n_x-n_y)\times d$, where d denotes a thickness of the layer, and $n_x$ and $n_y$ denote refractive coefficients in two orthogonal directions in a plane substantially perpendicular to a thickness direction of the layer. In such an embodiment, the phase retardation layer 12 may function as a half-wave plate.

The second phase retardation layer 13 may have an in-plane retardation value in a range from about 110 nm to about 160 nm at the standard wavelength. In one embodiment, for example, the in-plane retardation value of the second phase retardation layer 13 may be in a range from about 130 nm to about 140 nm at the standard wavelength. In such an embodiment, the second phase retardation layer 13 may function as a quarter-wave plate.

As described above, an embodiment of the optical film 10 may include a stack of a quarter-wave plate and a half-wave plate, and thus may function as a circular polarization film.

According to an embodiment, an out-of-plane retardation (Rth) value of the first phase retardation layer 12 and an out-of-plane retardation value of the second phase retardation layer 13 at the standard wavelength may have opposite signs. In one embodiment, for example, the out-of-plane retardation value of the first phase retardation layer 12 at the standard wavelength may be a positive value, and the out-of-plane retardation value of the second phase retardation layer 13 at the standard wavelength may be a negative value. The out-of-plane retardation Rth of a layer is generally given by the following equation: $Rth=\{[(n_x+n_y)/2]-n_z\}\times d$, where d denotes the thickness of the layer, $n_z$ denotes a refractive coefficient in the thickness direction of the layer, and $n_x$ and $n_y$ denote refractive coefficients in two orthogonal directions in a plane substantially perpendicular to the thickness direction of the layer.

According to an embodiment, an absolute value of the out-of-plane retardation of the first phase retardation layer 12 at the standard wavelength may be substantially equal to or less than about 300 nm, and an absolute value of the out-of-plane retardation of the second phase retardation layer 13 at the standard wavelength may be substantially equal to or less than about 160 nm.

According to an embodiment, an out-of-plane retardation value of the first phase retardation layer 12 at the standard wavelength may be in a range from about zero (0) nm to about 300 nm. In one embodiment, for example, the out-of-plane retardation value of the first phase retardation layer 12 at the standard wavelength may be in a range from about 130 nm to about 250 nm. In one embodiment, for example, the out-of-plane retardation value of the first phase retardation layer 12 at the standard wavelength may be in a range from about 200 nm to about 230 nm. An out-of-plane retardation value of the second phase retardation layer 13 at the standard wavelength may be in a range from about −160 nm to about zero (0) nm. In one embodiment, for example, the out-of-plane retardation value of the second phase retardation layer 13 at the standard wavelength may be in a range from about −130 nm to about −50 nm. In one embodiment, for example, the out-of-plane retardation value of the second phase retardation layer 13 at the standard wavelength may be in a range from about −120 nm to about −90 nm.

According to an embodiment, the first phase retardation layer 12 may have a short-wavelength dispersion value in a range from about 1.00 to about 1.05, and the second phase retardation layer 13 may have a short-wavelength dispersion value in a range from about 1.00 to about 1.20. The short-wavelength dispersion value of the first or second phase retardation layer 12 or 13 is defined as a ratio of a retardation value of the first or second phase retardation layer 12 or 13 at a wavelength of about 450 nm with respect to a retardation value of the first or second phase retardation layer 12 or 13 at the standard wavelength.

According to an embodiment, the first phase retardation layer 12 may have a long-wavelength dispersion value in a range from about 0.95 to about 1.00, and the second phase retardation layer 13 may have a long-wavelength dispersion value in a range from about 0.85 to about 1.00. The long-wavelength dispersion value of the first or second phase retardation layer 12 or 13 is defined as a ratio of a retardation value of the first or second phase retardation layer 12 or 13 at a wavelength of about 650 nm with respect to a retardation value of the first or second phase retardation layer 12 or 13 at the standard wavelength.

According to an embodiment, at least one of the first phase retardation layer 12 and the second phase retardation layer 13 may include at least one of a cyclo-olefin polymer, polyacrylate, polycarbonate ("PC"), polystyrene ("PST"), polyethylene terephthalate ("PET"), and a cellulose-based polymer. In one embodiment, for example, the first phase retardation layer 12 may include a cyclo-olefin polymer, and the second phase retardation layer 13 may include polyacrylate. The first or second phase retardation layer 12 or 13 including at least one of PST, polyacrylate and a cellulose-based polymer may have a negative value of the out-of-plane retardation at the standard wavelength.

According to an embodiment, at least one of the first phase retardation layer 12 and the second phase retardation layer 13 may be provided, e.g., formed, by stretching. The first phase retardation layer 12 and the second phase retardation layer 13 may be stacked by a roll-to-roll processing An alternative embodiment of an optical film for a display device will now be described in detail with reference to FIG. 2 to FIG. 4.

Figure 2:
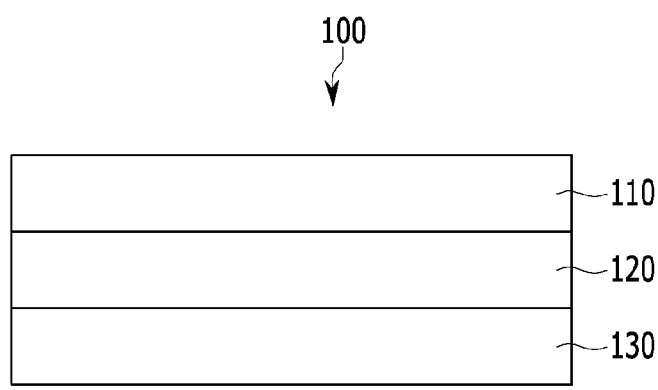
FIG. 2 is a schematic sectional view of an alternative embodiment of an optical film for a display device according to the invention.
Figure 3:
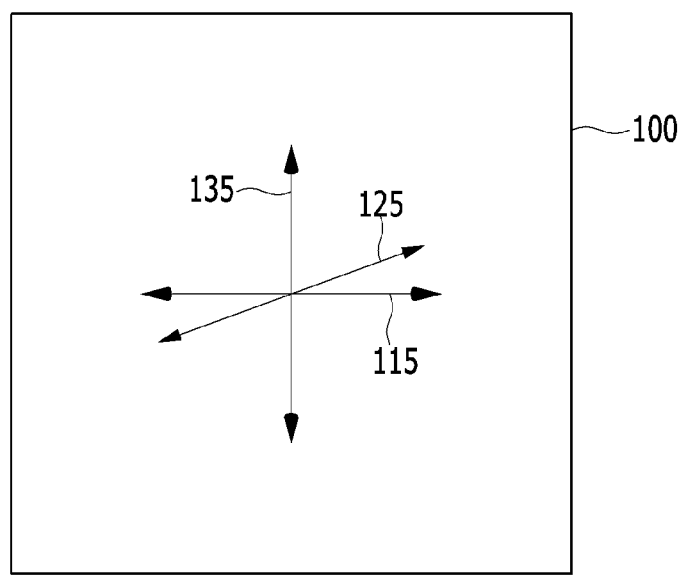
FIG. 3 is a schematic plan view of the optical film shown in FIG. 2.
Figure 4:
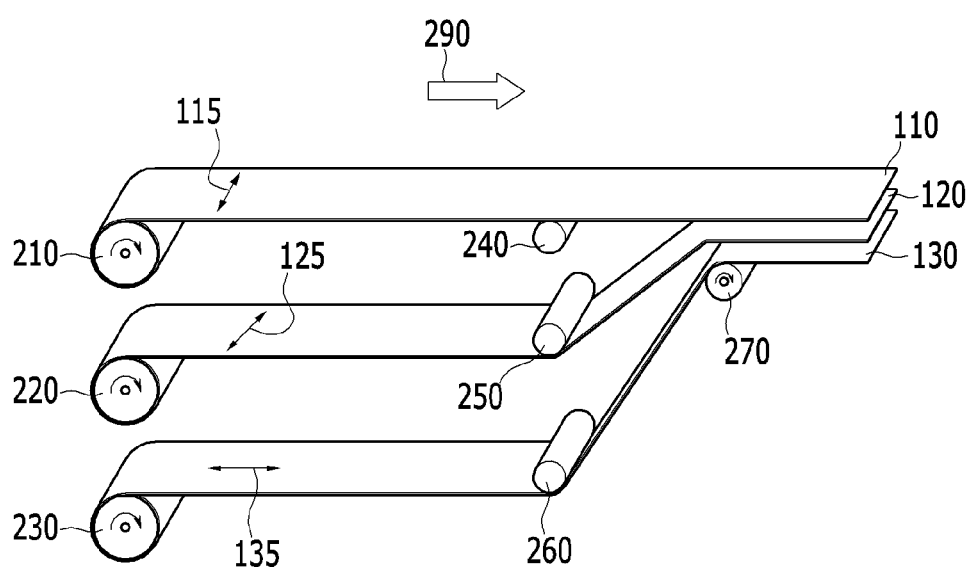
FIG. 4 is a schematic perspective view illustrating an embodiment of a method of manufacturing the optical film shown in FIG. 2 or FIG. 3 using a roll-to-roll processing.

FIG. 2 is a schematic sectional view of an alternative embodiment of an optical film for a display device according to the invention, FIG. 3 is a schematic plan view of the optical film shown in FIG. 2, and FIG. 4 is a schematic perspective view illustrating an embodiment of a method of manufacturing the optical film shown in FIG. 2 or FIG. 3 using a roll-to-roll processing.

Referring to FIG. 2 and FIG. 3, an embodiment of an optical film 100 for a display device includes a polarization layer 110, a first phase retardation layer 120 and a second phase retardation layer 130. In one embodiment, for example, the polarization layer 110, the first phase retardation layer 120 and the second phase retardation layer 130 may be stacked from top to bottom. In an alternative embodiment, the optical film 100 may further include an additional layer (not shown) disposed on the polarization layer 110, and the additional layer may protect the polarization layer 110 or may reduce or inhibit reflection or dazzling of light.

The polarization layer 110 may be a linear polarizer configured to convert the polarization of incident light into linear polarization, and may include poly-vinyl alcohol ("PVA") doped with iodine, for example.

The first phase retardation layer 120 may have an in-plane retardation value in a range from about 240 nm to about 300 nm. In one embodiment, for example, the first phase retardation layer 120 may have an in-plane retardation value in a range from about 260 nm to about 280 nm at the standard wavelength. In such an embodiment, the phase retardation layer 120 may function as a half-wave plate.

The second phase retardation layer 130 may have an in-plane retardation value in a range from about 110 nm to about 160 nm. In one embodiment, for example, the second phase retardation layer 130 may have an in-plane retardation value in a range from about 130 nm to about 140 nm at the standard wavelength. In such an embodiment, the second phase retardation layer 130 may functions as a quarter-wave plate.

An angle between an optic axis 125 of the first phase retardation layer 120 and a transmission axis 115 of the polarization layer 110 may be in a range from about 17 degrees to about 27 degrees or from about −27 degrees to about −17 degrees. An angle between an optic axis 135 of the second phase retardation layer 130 and the transmission axis 115 of the polarization layer 110 may be in a range from about 85 degrees to about 95 degrees. An angle between the optic axis 125 of the first phase retardation layer 120 and the optic axis 135 of the second phase retardation layer 13 may be in a range from about 63 degrees to about 73 degrees or from about −63 degrees to about −73 degrees. In such an embodiment, an absorption axis of the polarization layer 110 is substantially perpendicular to the transmission axis 115 of the polarization layer 110, such that an angle between the optic axis 125 of the first phase retardation layer 120 and the absorption axis of the polarization layer 110 may be in a range from about 63 degrees to about 73 degrees or from about −73 degrees to about −63 degrees, and an angle between the optic axis 135 of the second phase retardation layer 130 and the absorption axis of the polarization layer 110 may be in a range from about −5 degrees to about 5 degrees.

An optical film including a half-wave plate and a quarter-wave plate may convert linear polarization into circular polarization when the optical film satisfies a relation $\theta_1=2\theta_0+45°$, where $\theta_0$ denotes an angle between a slow axis of the half-wave plate and a predetermined reference direction, and $\theta_1$ denotes an angle between a slow axis of the quarter-wave plate and the predetermined reference direction.

As described above, an embodiment of the optical film may be provided, e.g., formed, by stacking the first phase retardation layer 120 of a half-wave plate and the second phase retardation layer 130 of a quarter-wave plate with the above-described angle such that the optical film functions as a circular polarization film.

According to an embodiment, an out-of-plane retardation value of the first phase retardation layer 120 and an out-of-plane retardation value of the second phase retardation layer 130 at the standard wavelength may have opposite signs. In one embodiment, for example, the out-of-plane retardation value of the first phase retardation layer 120 at the standard wavelength may be a positive value, and the out-of-plane retardation value of the second phase retardation layer 130 at the standard wavelength may be a negative value.

According to an embodiment, an absolute value of the out-of-plane retardation of the first phase retardation layer 120 at the standard wavelength may be substantially equal to or less than about 300 nm, and an absolute value of the out-of-plane retardation of the second phase retardation layer 130 at the standard wavelength may be substantially equal to or less than about 160 nm.

According to an embodiment, an out-of-plane retardation value of the first phase retardation layer 120 at the standard wavelength may be in a range from about zero (0) nm to about 300 nm. In one embodiment, for example, the out-of-plane retardation value of the first phase retardation layer 120 at the standard wavelength may be in a range from about 130 nm to about 250 nm. In one embodiment, for example, the out-of-plane retardation value of the first phase retardation layer 120 at the standard wavelength may be in a range from about 200 nm to about 230 nm. An out-of-plane retardation value of the second phase retardation layer 130 at the standard wavelength may be in a range from about −160 nm to about zero (0) nm. In one embodiment, for example, the out-of-plane retardation value of the second phase retardation layer 130 at the standard wavelength may be in a range from about −130 nm to t0 about −50 nm. In one embodiment, for example, the out-of-plane retardation value of the second phase retardation layer 130 at the standard wavelength may be in a range from about −120 nm to about −90 nm.

According to an embodiment, the first phase retardation layer 120 may have a short-wavelength dispersion value in a range from about 1.00 to about 1.05, and the second phase retardation layer 130 may have a short-wavelength dispersion value in a range from about 1.00 to about 1.20.

According to an embodiment, the first phase retardation layer 120 may have a long-wavelength dispersion value in a range from about 0.95 to about 1.00, and the second phase retardation layer 130 may have a long-wavelength dispersion value in a range from about 0.85 to about 1.00.

According to an embodiment, at least one of the first phase retardation layer 120 and the second phase retardation layer 130 may include at least one of a cyclo-olefin polymer, polyacrylate, PC, PST, PET and a cellulose-based polymer. In one embodiment, for example, the first phase retardation layer 120 may include a cyclo-olefin polymer, and the second phase retardation layer 130 may include polyacrylate. The first or second phase retardation layer 120 or 130 including at least one of PST, polyacrylate and a cellulose-based polymer may have a negative value of the out-of-plane retardation at the standard wavelength.

According to an embodiment, at least one of the first phase retardation layer 120 and the second phase retardation layer 130 may be provided, e.g., formed, by stretching. The polarization layer 110, the first phase retardation layer 120 and the second phase retardation layer 130 may be stacked using a roll-to-roll processing.

According to an embodiment, the first phase retardation layer 120 may include a positively birefringent material that has a slow axis representing a maximum refractive coefficient in a stretching direction. In one embodiment, for example, the first phase retardation layer 120 may include at least one of a cyclo-olefin polymer, PC, PET and a cellulose-based polymer. In an embodiment, an unstretched film including a positively birefringent material may be prepared and rolled to provide, e.g., form, a rolled film. The rolled film may be unrolled to proceed. The proceeded film may be stretched substantially in a direction oblique to a proceeding direction, and may be rolled again to form a roll of the first phase retardation layer 120 having an oblique optic axis, e.g., an oblique slow axis. The oblique stretching may be performed with adjusting the stretching rate to obtain a predetermined retardation value and with adjusting the stretching direction such that the slow axis of the first phase retardation layer 120 may be at an angle in a range of from about 17 degrees to about 27 degrees or from about −27 degrees to about −17 degrees with respect to a direction substantially perpendicular to the proceeding direction of the proceeded film. A method of oblique stretching is disclosed in Korean Patent Application Publication No. 2008-0071150, the content of which in its entirety is herein incorporated by reference.

According to an embodiment, the second phase retardation layer 130 may include a negatively birefringent material that has a slow axis representing a maximum refractive coefficient in a direction substantially perpendicular to a stretching direction. In one embodiment, for example, the second phase retardation layer 130 may include a polymer including PST, acrylic polymer, PC, acrylate-styrene copolymer, and a combination of at least two of the above-listed materials. An unstretched film including a negatively birefringent material may be prepared and rolled to form a rolled film. The rolled film may be unrolled and proceed. The proceeded film may be stretched in a direction substantially perpendicular to a proceeding direction, and may be rolled again to form a roll of the second phase retardation layer 130 having a slow axis substantially parallel to the proceeding direction of the proceeded film. The stretching may be performed with adjusting the stretching rate to obtain a predetermined retardation value and with adjusting the stretching direction such that the slow axis of the second phase retardation layer 130 may be at an angle in a range of from about 85 degrees to about 95 degrees with respect to the proceeding direction of the proceeded film.

Referring to FIG. 4, a plurality of rolls 210, 220 and 230 of the stretched polarization layer 110, the stretched first phase retardation layer 120 and the stretched second phase retardation layer 130 may be prepared. The films of the polarization layer 110, the first phase retardation layer 120 and the second phase retardation layer 130 in the rolls 210, 220 and 230 may be unrolled and proceeded in a predetermined direction 290. The polarization layer 110 may have a stretching direction substantially parallel to the proceeding direction 290 and a transmission axis 115 substantially perpendicular to the stretching direction. The first phase retardation layer 120 may have a stretching direction and a slow axis, both having an angle in a range from about 63 degrees to about 73 degrees or from about −73 degrees to about −63 degrees with to the proceeding direction 290. The second phase retardation layer 130 may have a stretching direction and a slow axis, both having an angle in a range from about −5 degrees to about 5 degrees with respect to the proceeding direction 290.

The films of the layers 110, 120 and 130 may be gathered in a place by a lamination roller 270, and may be laminated or stacked and attached to one another. In such an embodiment, as shown in FIG. 4, subsidiary rollers 240, 250 and 260 configured to maintain the films of the layers 110, 120 and 130 flat may be used.

An alternative embodiment of an optical film for a display device according to an embodiment will be described in detail with reference to FIG. 5.

Figure 5:
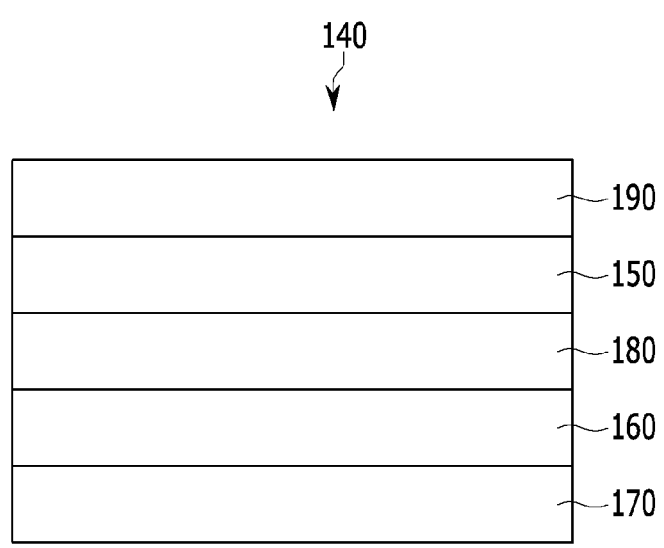
FIG. 5 is a schematic sectional view of another alternative embodiment of an optical film for a display device according to the invention.

FIG. 5 is a schematic sectional view of another alternative embodiment of an optical film for a display device according to the invention.

Referring to FIG. 5, an embodiment of an optical film 140 for a display device has a structure similar to the embodiment of the optical film 100 shown in FIG. 2. In an embodiment, the optical film 140 includes a polarization layer 150, a first phase retardation layer 160 and a second phase retardation layer 170, which may be stacked from top to bottom. In such an embodiment, as shown in FIG. 5, the optical film 140 further includes a first passivation layer 180 and a second passivation layer 190. In such an embodiment, the first passivation layer 180 is disposed between the polarization layer 150 and the first phase retardation layer 160, and the second passivation layer 190 is disposed on the polarization layer 150.

The first and second passivation layers 180 and 190 are configured to protect the polarization layer 150, and may include triacetyl cellulose ("TAC"), for example.

The second passivation layer 190, which is disposed on the top of the optical film 140, may have characteristics of anti-reflection, low-reflection, anti-glare or hard coating, for example.

In an alternative embodiment, one of the first passivation layer 180 and the second passivation layer 190 may be omitted.

The polarization layer 150 and the first and second phase retardation layers 160 and 170 shown in FIG. 5 are substantially the same as the polarization layer 110 and the first and second phase retardation layers 120 and 130 shown in FIG. 2, and any repetitive detailed description thereof will hereinafter be omitted.

The embodiments of the optical film 10, 100 and 140 shown in FIG. 1, FIG. 2 and FIG. 5 may be included in a display device, such as a flat panel display including a liquid crystal display and an organic light emitting display, for example.

An embodiment of an organic light emitting display will be described in detail with reference to FIG. 6.

Figure 6:
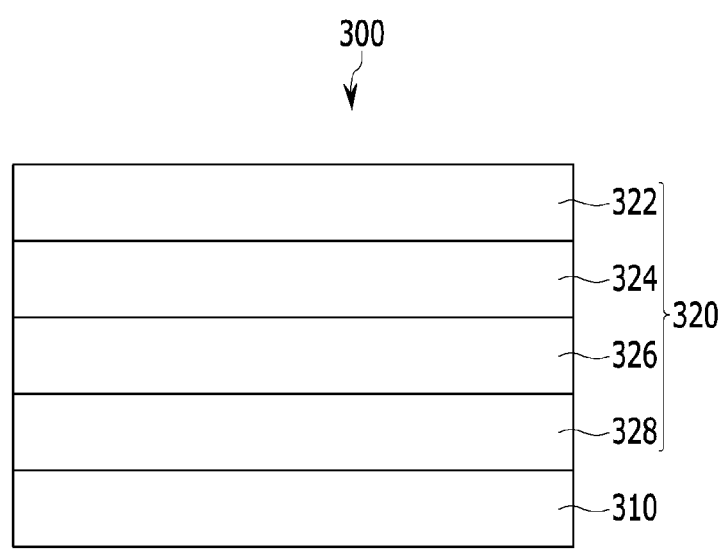
FIG. 6 is a schematic sectional view of an embodiment of an organic light emitting display according to the invention.

FIG. 6 is a schematic sectional view of an embodiment of an organic light emitting display according to the invention.

Referring to FIG. 6, an embodiment of an organic light emitting display 300 includes an organic light emitting panel 310 configured to display images and an optical film 320 disposed on, e.g., attached to, the organic light emitting panel 310.

The organic light emitting panel 310 may include a pair of electrodes (not shown) disposed opposite to, e.g., facing, each other and a light emitting layer (not shown) disposed between the pair of electrodes and including an organic light emitting material.

The optical film 320 may include a passivation layer 322, a polarization layer 324, a first phase retardation layer 326 and a second phase retardation layer 328, which may be stacked from top to bottom.

The polarization layer 324 and the first and second phase retardation layers 326 and 328 of the optical film shown in FIG. 6 may have substantially the same characteristics as the polarization layer 110 and the first and second phase retardation layers 120 and 130, respectively, shown in FIG. 2. In one embodiment, for example, the polarization layer 324 may be a linear polarizer, the first phase retardation layer 326 may be a half-wave plate, and the second phase retardation layer 328 may be a quarter-wave plate.

The passivation layer 322 may protect the polarization layer 324, and may include TAC, for example. According to an embodiment, the passivation layer 322 may have characteristics of anti-reflection, low-reflection, anti-glare or hard coating, for example.

External light incident on the organic light emitting display 300 may enter into the organic light emitting panel 310 through the optical film 320, and may be reflected by a reflective member, for example, an electrode of the organic light emitting panel 310. When the external light incident on the organic light emitting display 300 enters into the organic light emitting panel 310, the external light may be linearly polarized after passing through the polarization layer 324, and the linearly polarized external light may be retarded by about a half wavelength when passing through the first phase retardation layer 326 such that the polarization direction of the external light is changed. Thereafter, the external light may be retarded by about a quarter wavelength when passing through the second phase retardation layer 328 such that the linear polarized external light may be converted into a circular polarized light. After passing through the second phase retardation layer 328, the circularly polarized external light may be reflected by the reflective member of the organic light emitting panel 310, and then may travel towards the second phase retardation layer 328 again. The reflected light may be retarded by about a quarter wavelength when secondly passing through the second phase retardation layer 328 such that the circular polarized light may be converted back into a linear polarized light. The linearly polarized light may be retarded by about a half wavelength when secondly passing through the first phase retardation layer 326 such that the polarization direction of the light may be changed. As a result, the external light initially incident on the organic light emitting panel 310 after firstly passing through the polarization layer 324 may pass through (the first phase retardation layer 326 and) the second phase retardation layer 328 twice such that a polarization axis of the external light rotates about 90 degrees when the external light reaches the polarization layer 324 again. As a result, even when external light is reflected in the organic light emitting display 300 including the organic light emitting panel 310, leakage of the reflected light from the organic light emitting display 300 is substantially reduced or effectively prevented, thereby substantially improving the image quality of the organic light emitting display 300.

An exemplary experiment performed with several exemplary embodiments and two comparative examples of the optical film will be described in detail with reference to FIG. 7.

Figure 7:
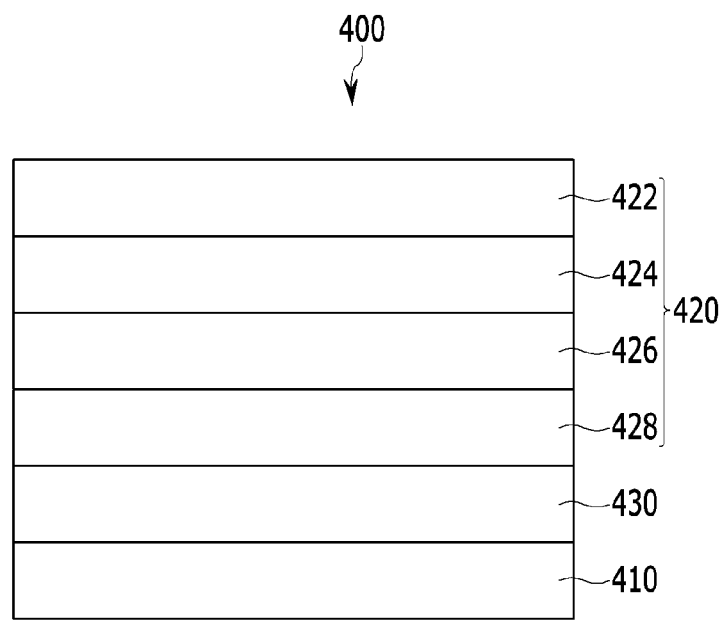
FIG. 7 is a schematic sectional view of an experimental device including an optical film according to an experimental example of an embodiment of the invention and comparative examples.

FIG. 7 is a schematic sectional view of an experimental device including an optical film according to an experimental example according to one or more embodiment of the invention and comparative examples.

Referring to FIG. 7, an optical film 420 including a passivation layer 422, a polarization layer 424, a first phase retardation layer 426 and a second phase retardation layer 428 was disposed on, e.g., attached to, a reflector 410 with the adhesion layer 430, and reflectance and color shift of the combined device were measured in an exemplary experiment.

Manufacturing First Phase Retardation Layer 426

A cyclo-olefin polymer ("COP") film (ZEONOR produced by Zeon Chemicals L.P. in Japan) was obliquely stretched in a direction at an angle of about 22.5 degrees with respect to a transverse direction that is substantially perpendicular to a proceeding direction of the COP film. The oblique stretch was performed such that an edge of the COP film was stretched in the transverse direction and an opposite edge of the COP film was stretched in the direction at an angle of about 22.5 degrees with respect to the transverse direction. For Experimental Examples 1 to 7, the in-plane retardation values and the out-of-plane retardation values of the stretched COP film (i.e., the first phase retardation film 426) shown in Table 1 were obtained at the temperature ranging from about 105° C. to about 125° C. during the stretch and with the stretching ratio ranging from about 1.3 to about 3. A surface of the first phase retardation film 426 was primer treated with silicone particles to enhance the strength of adhesion in a following process. A thickness of the first phase retardation film 426 was about 45 microns ($\mu$m).

Manufacturing Second Phase Retardation Layer 428

A styrene-butadiene rubber ("SBR") toughened poly(m-ethyl methacrylate) (PMMA) film having negative birefringence (produced by LG CHEM, LTD. in Korea) was stretched in the transverse direction to form a second phase retardation layer 428. The SBR toughened PMMA film includes a PMMA film and SBR particles in the PMMA film. For Experimental Examples 1 to 7, the in-plane retardation values and the out-of-plane retardation values of the second phase retardation layer 428 shown in Table 1 were obtained at the temperature ranging equal to or lower than about 110° C. during the stretch. A thickness of the second phase retardation layer 428 was about 55 $\mu$m.

Manufacturing Polarization Layer 424

A PVA film (PS60 produced by KURARAY CO., LTD. in Japan) was dyed with iodine at a temperature of about 27 degrees, and, thereafter, was stretched in the proceeding direction at a temperature of about 57° C. and at a stretch ratio of about six (6) to form a polarization layer 424 with a thickness of about 22 $\mu$m.

First Lamination

An aquatic adhesive of a PVA solution including water at a ratio of about 99 wt % was coated on both surfaces of the above-described polarization layer 424, and a thickness of each of the aquatic adhesive was about 200 nm. The first phase retardation layer 426, the polarization layer 424, and a passivation layer 422 were laminated with the adhesive to form a first laminated film. The passivation layer 422 was a low reflectance ("LR") film (DSG03SC-60 produced by Dai Nippon Printing ("DNP") CO., LTD in Japan) having a thickness of about 60 $\mu$m. The LR film includes a TAO base substrate and a plurality of hollow silica particles coated on the base substrate. The first phase retardation layer 426 was aligned such that the primer treated surface faces the polarization layer 424.

A surface opposite the primer-treated surface of the first phase retardation layer 426 of the first laminated film was corona treated to enhance the strength of adhesion, and was coated with an epoxy resin adhesive having a thickness of about 25 $\mu$m. Thereafter, a separator was attached to the epoxy resin adhesive.

Second Lamination

The separator on the first laminated film was removed, and the first laminated film and the second phase retardation layer 428 were laminated with the epoxy resin adhesive on the first laminated film to form an optical film 420.

Coating of Adhesion Layer 430 and Film Cutting

An adhesion layer 430 of epoxy resin adhesive having a thickness of about 25 $\mu$m was coated on the second phase retardation layer 428 of the optical film 420 manufactured by the second lamination, and a separator was attached onto the adhesion layer 430. Thereafter, the optical film 420 with the adhesion layer 430 and the separator was aged. Next, the optical film 420 with the adhesion layer 430 was cut into pieces with a moving cutter.

Measurement of In-Plane Retardation and Out-of-Plane Retardation

The in-plane retardation values and in-plane retardation values of the first phase retardation layer 426 and the second phase retardation layer 428 were measured using Axoscan (produced by Axometrix, Inc.). The in-plane retardation values were scanned with varying the azimuthal angle from about zero to about 360 degrees to find out a direction in which the in-plane retardation value was a maximum. The direction of the maximum retardation value was determined as an optic axis, i.e., the slow axis of a layer 426 or 428. The refractive coefficient in the optical axis is defined as nx.

Measurement and Calculation of Reflective Characteristics

A black plate and a mirror as a reflector 410 were prepared, and light from D65 standard light source was reflected by the black plate and the reflector 410 to measure luminance of the reflected light using EZContrast (produced by ELDIM in France).

Next, the optical film 420 was attached on the reflector 410 with the adhesion layer 430, and the reflected-light luminance of the optical film 420 was measured.

At this time, for a given polar angle, the reflected-light luminance was measured with varying an azimuthal angle by a unit of about one degree from about zero to about 360 degrees, and the measured luminance values were averaged.

A reflectance of the optical film 420 was given by:

Reflectance=((average luminance of optical film)–(average luminance of black plate))/((average luminance of reflector)–(average luminance of black plate))×100

The measurement was repeatedly performed for various polar angles to obtain reflectance for corresponding polar angles.

The color shift was obtained by measuring color value of the reflected light for the optical film 420, converting the color value into a color coordinate in a Lab coordinate system, and calculating a distance ($=(a^{*2}+b^{*2})^{1/2}$) of the color coordinate from an origin ($(a^*,b^*)=(0,0)$).

The above-described processes were repeatedly performed for each of Experimental Examples 1 to 7.

Comparative Example 1

The above-described processes were applied to Comparative Example 1 except that a material for the second phase retardation layer 428 was COP that was substantially the same as the material for the first phase retardation layer 426.

Comparative Example 2

A (second) phase retardation layer 428 was formed by stretching a COP film (ZEONOR produced by Zeon Chemicals L.P. in Japan) in the transverse direction. A polarization layer 424 was formed by the above-described process for Experimental Examples, and cut into pieces. The piece of the polarization layer 424, the phase retardation layer 428, and a passivation layer 422 were aligned such that the optic axis of the phase retardation layer 428 makes an angle of about 45 degrees with the transmission axis of the piece of the polarization layer 424, and laminated like the process of the first lamination. Following processes were substantially the same as the above-described processes for Experimental Examples.

Results

The experimental conditions and results for the optical film 420 according to the Experimental Example and Comparative Examples are shown in Table 1.

TABLE 1

|  | 1st layer | | 2nd layer | | Angle | | Reflectance | | Color Shift | |
| --- | --- | --- | --- | --- | --- | --- | --- | --- | --- | --- |
|  | Re | Rth | Re | Rth | 1st layer | 2nd layer | (%) front | lateral | front | lateral |
| Experimental | 260 | 218 | 130 | −100 | 22.5 | 90 | 1.8 | 4.4 | 6.8 | 10.3 |
| Experimental | 265 | 209 | 130 | −100 | 22.5 | 90 | 1.8 | 4.8 | 5.6 | 10.2 |
| Experimental | 270 | 212 | 130 | −100 | 22.5 | 90 | 1.8 | 5.1 | 4.5 | 10.8 |
| Experimental | 275 | 218 | 130 | −100 | 22.5 | 90 | 1.8 | 5.2 | 5.3 | 11.1 |
| Experimental | 280 | 226 | 130 | −100 | 22.5 | 90 | 1.9 | 5.3 | 4.5 | 10.9 |
| Experimental | 260 | 218 | 135 | −110 | 22.5 | 90 | 2.2 | 4.6 | 9.1 | 10.7 |
| Experimental | 260 | 218 | 140 | −113 | 22.5 | 90 | 2.7 | 4.6 | 9.1 | 10.4 |
| Comparative | 280 | 140 | 140 | 70 | 22.5 | 90 | 3.2 | — | 19.5 | — |
| Comparative | — | — | 140 | 70 | — | 45 | 1.9 | — | 18.7 | — |

In Table 1, "1st layer" denotes the first phase retardation layer 426, "2nd layer" denotes the second phase retardation layer 428, and "Angle" denotes an angle of the slow axis of the first phase retardation layer 426 or the second phase retardation layer 428 with respect to the transmission axis of the polarization layer 424. The reflectance and color shift were shown for a front direction at a polar angle of about 8 degrees and a lateral direction at a polar angle of about 45 degrees.

Referring to Table 1, in Experimental Examples 1 to 7, the front reflectance was low to show values less than about 3%, and the lateral reflectance was also low to exhibit values less than about 6%. In view of color shift, the value for the front direction was less than 10, which is low, and the value for the lateral direction was less than 12, which is also low to exhibit nearly black.

in Comparative Examples 1 and 2, the front reflectance was low to exhibit values of less than about 3.2%. However, the color shift for the front direction is very high to show values of about 18.7 and about 19.5. Therefore, the color of the reflected light may be very different from the color of the light before the reflection in the Comparative Examples.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical film comprising:
   a polarization layer;
   a first phase retardation layer having a slow axis at an angle in a range from about 17 degrees to about 27 degrees or from about −27 degrees to about −17 degrees with respect to a transmission axis of the polarization layer, wherein the first phase retardation layer functions as a half-wave plate; and
   a second phase retardation layer having a slow axis at an angle in a range from about 85 degrees to about 95 degrees with respect to the transmission axis of the polarization layer, wherein the second phase retardation layer functions as a quarter-wave plate,
   wherein the polarization layer is disposed on the first phase retardation layer,
   the first phase retardation layer is disposed on the second phase retardation layer,
   an in-plane retardation value of the first phase retardation layer at a standard wavelength of about 550 nanometers is in a range from about 240 nanometers to about 300 nanometers,
   an in-plane retardation value of the second phase retardation layer at the standard wavelength is in a range from about 110 nanometers to about 160 nanometers,
   an out-of-plane retardation value of the first phase retardation layer at the standard wavelength and an out-of-plane retardation value of the second phase retardation layer at the standard wavelength have opposite signs,
   the out-of-plane retardation value of the first phase retardation layer has a positive sign,
   the out-of-plane retardation value of the second phase retardation layer has a negative sign, and
   a magnitude of the out-of-plane retardation value of the first phase retardation layer is greater than the out-of-plane retardation value of the second phase retardation layer.

2. The optical film of claim 1, wherein
   the first phase retardation layer has a short-wavelength dispersion value in a range from about 1.00 to about 1.05,
   the second phase retardation layer has a short-wavelength dispersion value in a range from about 1.00 to about 1.20,
   the first phase retardation layer has a long-wavelength dispersion value in a range from about 0.95 to about 1.00, and
   the second phase retardation layer has a long-wavelength dispersion value in a range from about 0.85 to about 1.00.

3. The optical film of claim 1, wherein
   at least one of the first phase retardation layer and the second phase retardation layer comprises at least one of a cyclo-olefin polymer, polyacrylate, polycarbonate, polystyrene, polyethylene terephthalate and a cellulose-based polymer.

4. The optical film of claim 3, wherein
the first phase retardation layer comprises a cyclo-olefin polymer, and
the second phase retardation layer comprises polyacrylate.

5. The optical film of claim 1, further comprising:
a passivation layer disposed opposite to the second phase retardation layer with respect to the first phase retardation layer.

6. The optical film of claim 1, wherein
the polarization layer includes a first roll film extending in a first direction substantially perpendicular to the transmission axis,
the first phase retardation layer includes a second roll film extending in the first direction, having a slow axis at an angle in a range from about 17 degrees to about 27 degrees or from about −27 degrees to about −17 degrees with respect to a second direction substantially perpendicular to the first direction, and disposed on the first roll film, and
the second phase retardation layer includes a third roll film extending in the first direction, having a slow axis at an angle in a range from about 85 degrees to about 95 degrees with respect to the second direction, and disposed on the second roll film.

7. The optical film of claim 1, wherein
the in-plane retardation value of the first phase retardation layer at the standard wavelength is in a range from about 260 nanometers to about 280 nanometers, and
the in-plane retardation value of the second phase retardation layer at the standard wavelength is in a range from about 130 nanometers to about 140 nanometers.

8. The optical film of claim 1, wherein
the out-of-plane retardation value of the first phase retardation layer at the standard wavelength is in a range from about 200 nanometers to about 230 nanometers, and
the out-of-plane retardation value of the second phase retardation layer at the standard wavelength is in a range from about −120 nanometers to about −90 nanometers.

9. A display device comprising:
a display panel; and
an optical film disposed on the display panel, wherein the optical film comprises, a polarization layer, a first phase retardation layer and a second phase retardation layer,
wherein the second phase retardation layer is disposed between the display panel and the first phase retardation layer,
the polarization layer is disposed opposite to the second phase retardation layer with respect to the first phase retardation layer,
the first phase retardation layer functions as a half-wave plate and has a slow axis at an angle in a range from about 17 degrees to about 27 degrees or from about −27 degrees to about −17 degrees with respect to a transmission axis of the polarization layer; and
the second phase retardation layer functions as a quarter-wave plate and has a slow axis at an angle in a range from about 85 degrees to about 95 degrees with respect to the transmission axis of the polarization layer,
an in-plane retardation value of the first phase retardation layer at a standard wavelength of about 550 nanometers is in a range from about 240 nanometers to about 300 nanometers,
an in-plane retardation value of the second phase retardation layer at the standard wavelength is in a range from about 110 nanometers to about 160 nanometers,
an out-of-plane retardation value of the first phase retardation layer at the standard wavelength and an out-of-plane retardation value of the second phase retardation layer at the standard wavelength have opposite signs,
the out-of-plane retardation value of the first phase retardation layer has a positive sign,
the out-of-plane retardation value of the second phase retardation layer has a negative sign, and
a magnitude of the out-of-plane retardation value of the first phase retardation layer is greater than the out-of-plane retardation value of the second phase retardation layer.

10. The display device of claim 9, wherein at least one of the first phase retardation layer and the second phase retardation layer comprises at least one of a cyclo-olefin polymer, polyacrylate, polycarbonate, polystyrene, polyethylene terephthalate and a cellulose-based polymer.

11. The display device of claim 9, wherein
the out-of-plane retardation value of the first phase retardation layer at the standard wavelength is in a range from about 200 nanometers to about 230 nanometers, and
the out-of-plane retardation value of the second phase retardation layer at the standard wavelength is in a range from about −120 nanometers to about −90 nanometers.

* * * * *